(12) United States Patent
Inoue

(10) Patent No.: US 7,352,757 B2
(45) Date of Patent: Apr. 1, 2008

(54) RELAY DEVICE

(75) Inventor: Yuichi Inoue, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 857 days.

(21) Appl. No.: 10/720,316

(22) Filed: Nov. 24, 2003

(65) Prior Publication Data

US 2004/0105407 A1    Jun. 3, 2004

(30) Foreign Application Priority Data

Nov. 26, 2002    (JP)    ............... 2002-342510

(51) Int. Cl.
  *H04L 12/56*    (2006.01)
  *H04L 12/26*    (2006.01)

(52) U.S. Cl. .................................... 370/401

(58) Field of Classification Search ............... 370/351, 370/389, 400, 401, 402, 229; 709/241, 242
See application file for complete search history.

(56) References Cited

U.S. PATENT DOCUMENTS 5,491,692 A * 2/1996 Gunner et al. ............. 370/402
6,493,318 B1 * 12/2002 Bare ......................... 370/238
7,016,306 B2 * 3/2006 Alapuranen et al. ........ 370/238
7,209,435 B1 * 4/2007 Kuo et al. .................. 370/219
2004/0053624 A1 * 3/2004 Frank et al. ................ 455/453
2004/0064583 A1 * 4/2004 Dani et al. .................. 709/241
2004/0071087 A1 * 4/2004 Siev et al. .................. 370/235

FOREIGN PATENT DOCUMENTS

| JP | 6-037865 | 2/1994 |
| JP | 11 136290 | 5/1999 |
| JP | 2001-211204 | 8/2001 |

OTHER PUBLICATIONS

Notification of Reason(s) for Refusal dated Jun. 5, 2007, from the corresponding Japanese Application.

* cited by examiner

*Primary Examiner*—Hassan Kizou
*Assistant Examiner*—Betty Lee
(74) *Attorney, Agent, or Firm*—Katten Muchin Rosenman LLP

(57) ABSTRACT

In a relay device which load balances or provides redundancy, a monitoring portion monitors states of other relay devices belonging to the same group, and a load balancing receiver load balances receiving packets with the other relay devices or provides redundancy based on the states of the other relay devices. Also, whether or not to relay packets is determined based on a group table preset.

3 Claims, 9 Drawing Sheets

40 GROUP TABLE

| RELAY DEVICE ADDRESS | GROUP ID | WEIGHT | PREFERENCE |
|---|---|---|---|
| RELAY DEVICE 100_1 | 1 | 1 | 10 |
| RELAY DEVICE 100_2 | 1 | 2 | 20 |
| ... | ... | ... | ... |
| RELAY DEVICE 100_m-1 | 2 | 1 | 40 |
| RELAY DEVICE 100_m | 2 | 1 | 50 |

40 GROUP TABLE

| RELAY DEVICE ADDRESS | GROUP ID | WEIGHT | PREFERENCE |
|---|---|---|---|
| RELAY DEVICE 100_1 | 1 | 1 | 10 |
| RELAY DEVICE 100_2 | 1 | 2 | 20 |
| RELAY DEVICE 100_3 | 1 | 1 | 30 |

RELAY DEVICE

BACKGROUND OF THE INVENTION

1. Field of the Invention

The present invention relates to a relay device, and in particular to a relay device which load balances or provides redundancy.

Recently, with developments of communication technology, information transmitted includes voices, static images, video contents, and the like, in which such a multimedia traffic transmission requires a high reliability. In order to secure the high reliability, the redundancy and the load balancing are important in a network.

2. Description of the Related Art

FIG. 11 shows a network using prior art relay devices 110_1, . . . , and 110_n, which forms a group of them (hereinafter, occasionally represented by a reference numeral 110) connected to the same transmission line which connects a communication device 200_1 to a communication device 200_2.

Each of the relay devices 110 is provided with a mutual monitor functional portion, a redundant reception functional portion, and a relay functional portion (not shown). Among these, the mutual monitor functional portion of the relay device 110_1, for example, monitors the states of the other relay devices 110 within the group. When determining that its own device has the highest preference (priority) within the relay devices 110 which are in a normal condition the relay device 110_1 notifies the fact to the redundant reception functional portion of its own device.

Based on this notification, the redundant reception functional portion receives a packet, and the relay functional portion relays this packet according to preset path information.

In this network configuration, only the single relay device 110_1 receives and relays packets during normal times while other relay devices 110_2-110_n assume an unavailable state. Namely, packets are concentrated on the relay device 110_1, and they can not be balanced with the other relay devices 110_2-110_n.

Thus, since data (packets) to be relayed concentrate on a single relay device, packets which can not be relayed will result. Also, as for load balancing by a hot standby configuration, it can not be performed on the same communication path.

FIG. 12 shows a network in which the load balancing is performed by arranging a load balancer 400 between a communication device 200 and relay devices 120_1-120_n.

Since the single load balancer 400 changes a transmitting destination based on a source address and a destination address of a packet, this network is not configured redundantly.

Also, in the prior art duplex operation method for communication protocol processor, the communication protocol processor is connected to a control processor such as a switchboard, adopts a synchronization method by a flag pattern as a data link layer protocol, uses a procedure for communicating by a frame having a link identifier, has a duplex configuration, and accommodates a line into which a plurality of data links are multiplexed. This communication protocol processor is provided with first means by which an input side of each of the communication protocol processors from the line inputs the same frame to both systems and an output side of each of the communication protocol processors in both systems to the line transmits the frame multiplexed, and second means by which only a transmission/reception operation is made an enabling/disabling state per data link by the control processor's instructions. By the second means, half of the data links accommodated in the communication protocol processor is made a transmission/reception enabling state, and the other half is made a transmission/reception disabling state in one system. In the other system, states of the transmission/reception operation are made so as to reverse the states of the above system. Thus, the duplex communication protocol processor is operated in both systems, and processing of whole data links is performed by load balancing (see e.g. patent document 1).

This case also requires the first means (frame multiplexer 23) for multiplexing frames and for transmitting the frame to the output side, and a control processor 1 for providing instructions to the second means.

Patent Document 1:

Japanese Patent Application Laid-open No.6-37865 (pages 2-3 and FIG. 1)

In the network shown in FIG. 11 using such prior art relay devices, although the network is redundantly configured, load balancing is not enabled, a load is concentrated on a single relay device, and data which can not be relayed will result. Also, in the network shown in FIG. 12, although to load balancer 400 is required for the load balancing, the network is not redundantly configured. Also, in the processor shown in the Japanese Patent Application Laid-open No. 6-37865, the frame multiplexer and the control processor are required for the load balancing.

SUMMARY OF THE INVENTION

It is accordingly an object of the present invention to provide a relay device which realizes load balancing or redundancy of the relay device without providing a specific device such as a load balancer or a frame multiplexer.

In order to achieve the above-mentioned object, a relay device, according to the present invention, among a plurality of relay devices belonging to a single group or divided into two or more groups comprises: a monitoring portion for monitoring states of other relay devices belonging to the same group; and a load balancing receiver for load balancing receiving packets with the other relay devices or for providing redundancy based on the states of the other relay devices.

FIG. 1 shows a principle of the present invention, in which a plurality of relay devices 100_1-100_n (hereinafter, occasionally represented by a reference numeral 100) compose a single group. The relay device 100 is provided with a monitoring portion 30 and a load balancing receiver 10. The monitoring portion 30 monitors states of other relay devices belonging to the group to which its own device belongs.

The load balancing receiver 10, based on a monitoring result of the monitoring portion 30 such that another relay device 100_2 is in a disabling state for relaying packets, determines packets to be received so that load balancing is performed with the relay devices 100 belonging to the same group or redundancy is provided.

Thus, it becomes possible to load balance the packets with the relay devices belonging to the same group, to provide the redundancy, or to load balance and to provide the redundancy.

It is to be noted that the redundancy can be realized not by setting all of the relay devices 100_1-100_n to relay the limit relayable packet amount, but by setting them to relay less packet amount than the limit with some margin (with redundancy).

Also, in the present invention according to the above-mentioned invention, the monitoring portion may monitor whether or not the other relay devices are in an enabling state of relaying packets, and the load balancing receiver may load balance the receiving packets with the relay devices in the enabling state of relaying packets or may provide the redundancy.

Also, the present invention according to the above-mentioned invention further comprises a group table preset, and the load balancing receiver may determine, based on the group table, whether or not to receive packets.

Also, in the present invention according to the above-mentioned invention, the group table may allocate a preference and a weight indicating a degree of communication load to be accepted within the group to every relay device belonging to the same group, and the load balancing receiver, based on the preference and the weight, may determine receiving packets load balanced or for which the redundancy is provided.

FIG. 2 shows an arrangement of a group table 40, which shows a weight and a preference corresponding to each relay device. The load balancing receiver can determine packets to be received (i.e. packet amount) based on the preference and the weight.

Also, in the present invention according to the above-mentioned invention, the monitoring portion may be provided with a periodic transmitter for periodically transmitting a control packet indicating a state of its own device to an adjoining relay device belonging to the same group, and an adjoining device monitoring portion for monitoring the state of the other relay devices by receiving the control packet transmitted from the adjoining relay device.

Namely, the monitoring portion is provided with a periodic transmitter and an adjoining device monitoring portion. The periodic transmitter periodically transmits a control packet, e.g. hello packet indicating the state of its own device to an adjoining relay device belonging to the same group.

The adjoining device monitoring portion receives the control packet transmitted from the adjoining relay device to monitor the state of the adjoining relay device.

Also, in the present invention according to the above-mentioned invention, when receiving no control packet transmitted from the periodic transmitter of the adjoining relay device, the adjoining device monitoring portion may determine that the adjoining relay device is in a disabling state of relaying packets, and the load balancing receiver, based on the determination result, may determine receiving packets load balanced with the relay devices in an enabling state of relaying packets or for which the redundancy is provided.

Thus, the relay device can recognize the number of relay devices within the group.

Also, in the present invention according to the above-mentioned invention, the control packet may indicate a preference of its own device and a weight indicating a degree of communication load accepted within the group.

Thus, it becomes possible to notify the preference and the weight of each relay device to the adjoining relay devices.

Also, in the present invention according to the above-mentioned invention, the load balancing receiver may further be provided with an accepted load setting portion for setting an accepted load.

Also, in the present invention according to the above-mentioned invention, the load balancing receiver may be provided with a packet receiver for receiving packets, a receiving algorithm setting change portion for changing a receiving algorithm of the packet receiver based on the group table, and a receiving algorithm setting portion for setting the receiving algorithm changed to the packet receiver.

Namely, the load balancing receiver is provided with a packet receiver, a receiving algorithm setting change portion, and a receiving algorithm setting portion.

The receiving algorithm setting change portion, based on the group table, changes a receiving algorithm of the packet receiver. The receiving algorithm setting portion sets this changed receiving algorithm to the packet receiver. The packet receiver receives the packet based on the set algorithm.

Thus, it becomes possible to dynamically load balance the packets relayed or to make the relay device redundant based on the state of the relay devices belonging to the same group.

Also, in the present invention according to the above-mentioned invention, the receiving algorithm may be an algorithm for relaying the receiving packets to a single arbitrary relay device so that the packets are load balanced with the relay devices belonging to the group or the redundancy is provided.

Furthermore, in the present invention according to the above-mentioned invention, the relay devices belonging to the same group may be connected to a same transmission line, and a same physical address or a same layer 3 address may be assigned to the relay devices.

As shown in FIG. 1, the relay devices 100_1-100_n belonging to the same group are connected to the same transmission lines 300_1-300_m, and the same physical address or the same layer 3 address can be assigned.

It is to be noted that e.g. a communication device "m" uses a physical address "m" and a layer 3 address "m" as an address of a gateway, and communicates with the destination device of the relay device 100.

Thus, the relay devices 100_1-100_n belonging to the same group can receive a certain packet. It is to be noted that any one of the relay devices 100_1-100_n relays the same packet, as described above, and the other relay devices discard the packet.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which.

DESCRIPTION OF THE EMBODIMENTS

Figure 1:
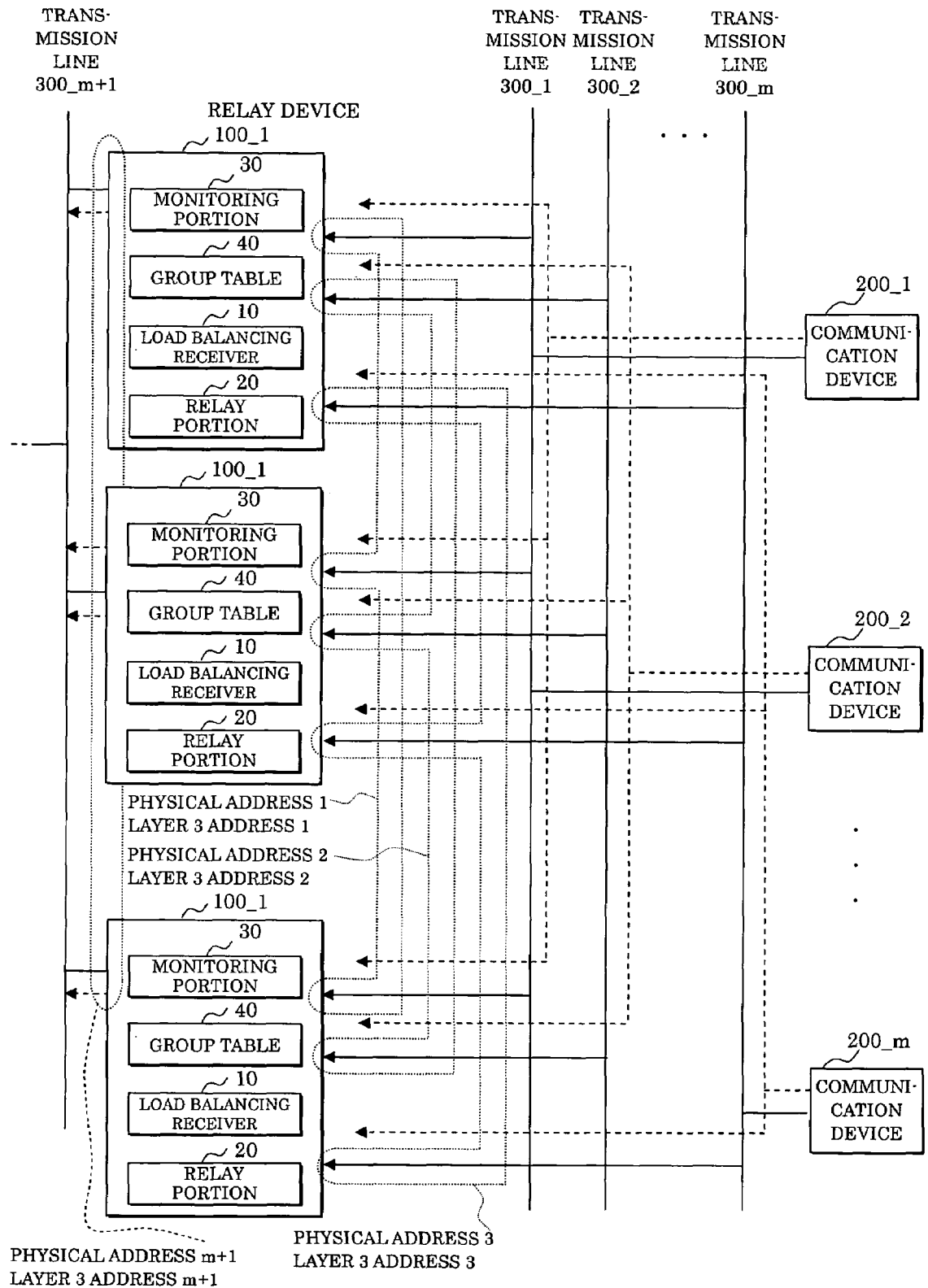
FIG. 1 is a block diagram showing a principle of a relay device according to the present invention.
Figures 2, 3:
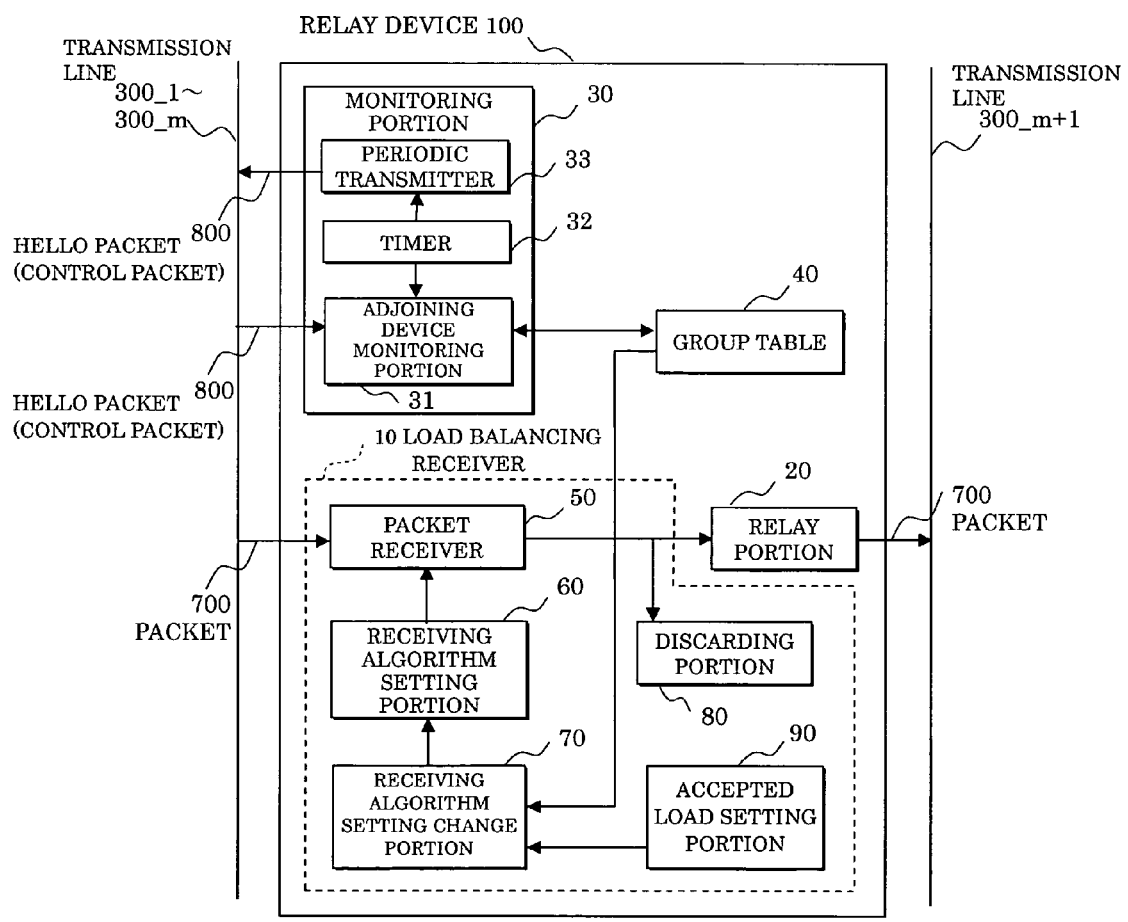
FIG. 2 is a diagram showing a group table example in a relay device according to the present invention.
FIG. 3 is a block diagram showing an embodiment of a relay device according to the present invention.

FIG. 3 shows an embodiment of the relay device 100 according to the present invention. The relay device 100 is composed of the load balancing receiver 10, the relay portion 20, the monitoring portion 30, and the group table 40. The load balancing receiver 10 is provided with a packet receiver 50 for receiving packets, a receiving algorithm setting change portion 70 for determining whether or not to change the algorithm for receiving packets, a receiving algorithm setting portion 60 for setting the changed algorithm in the packet receiver 50, an accepted load setting portion 90 for setting a load accepted by the packet receiver 50, and a discarding portion 80 for discarding the received packet.

The monitoring portion 30 is provided with a timer 32, a periodic transmitter 33 for transmitting a hello packet (control packet) 800 to other relay devices 100 belonging to the same group at a periodic time designated by the timer 32, and an adjoining device monitoring portion 31 for receiving the hello packet 800 from the other relay devices 100 belonging to the same group.

Figures 4, 5:
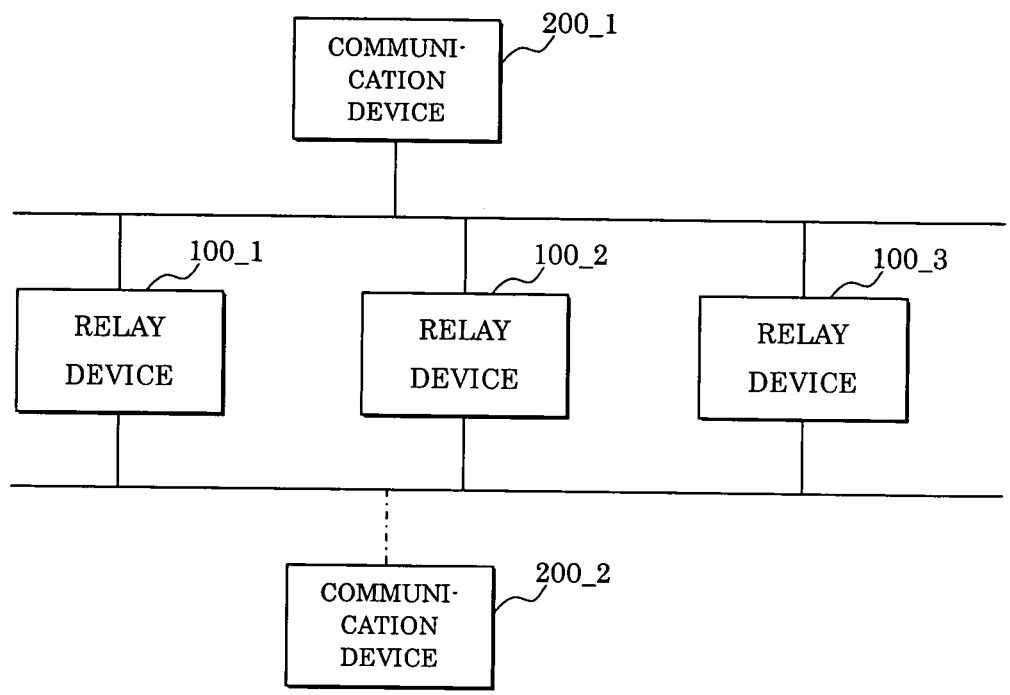
FIG. 4 is a block diagram showing a network example composed of relay devices according to the present invention.
FIG. 5 is a diagram showing an embodiment of a group table in a relay device according to the present invention.

FIG. 4 shows a network having the relay devices 100 shown in FIG. 3 as components. In this network, the relay devices 100_1-100_3 of the present invention are arranged between the communication devices 200_1 and 200_2.

FIG. 5 shows an embodiment of the group table 40 shown in FIG. 3. Each relay device 100 of the network shown in FIG. 4 is provided with the group table 40, which shows group ID's="1", "1", "1", weights="1", "2", "1", and preferences="10", "20", "30", respectively corresponding to the addresses of the relay devices 100_1-100_3.

The group ID is information for identifying a group to which the relay device 100 belongs. In the table 40, the group ID's of all of the relay devices 100 are "1", which indicates that the relay devices 100_1-100_3 belong to the same group "1".

The preference indicates a priority within the group, and the weight indicates a degree of communication load to be accepted within the group.

It is to be noted that the same contents may be preset in the group tables 40 of all of the relay devices 100_1-100_3 belonging to the same group.

Alternatively, in an initial state, the ID, the weight, and the preference of only its own relay device 100 may be preset in the group table 40 of each relay device 100, while the ID's, the weights, and the preferences of the other relay devices 100 may be exchanged by e.g. the hello packet 800.

Figure 6:
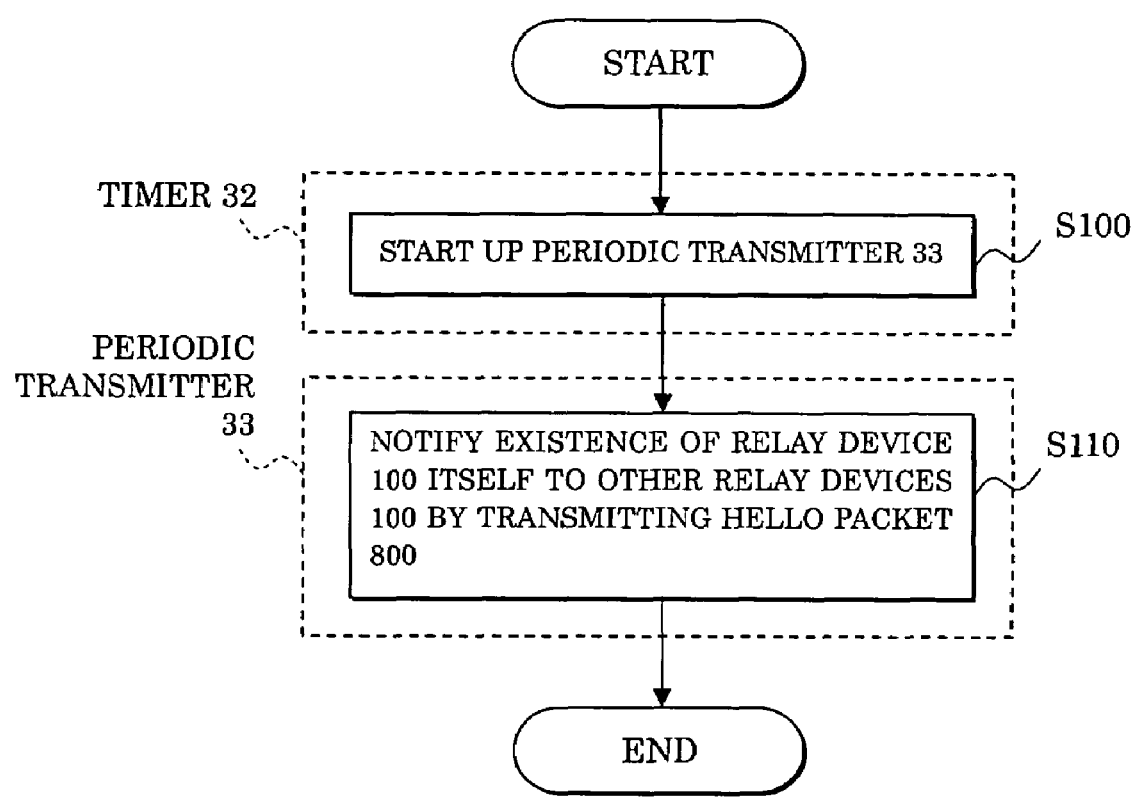
FIG. 6 is a flow chart showing an operation example of a periodic transmission in a relay device according to the present invention.

FIG. 6 shows a procedure by which the relay device 100 transmits e.g. the hello packet 800 to the other relay devices 100 belonging to the same group. This procedure will now be described.

Step S100: The timer 32 starts up the periodic transmitter 33 (see FIG. 3).

Step S110: The periodic transmitter 33 notifies the existence of the relay device 100 itself (in the enabling state of relaying packets) to the other relay devices 100 by transmitting the hello packet 800.

At this time, the periodic transmitter 33 notifies the ID, the weight, and the preference of its own device carried on the hello packet 800 to the other relay devices 100. The adjoining device monitoring portions 31 of the other relay devices 100 having received the hello packet 800 register the ID, the weight, and the preference of the relay device except their own devices in the group table 40.

Thus, all of the relay devices 100 belonging to the same group can hold the group tables 40 having the setting contents shown in FIG. 5.

Figure 7:
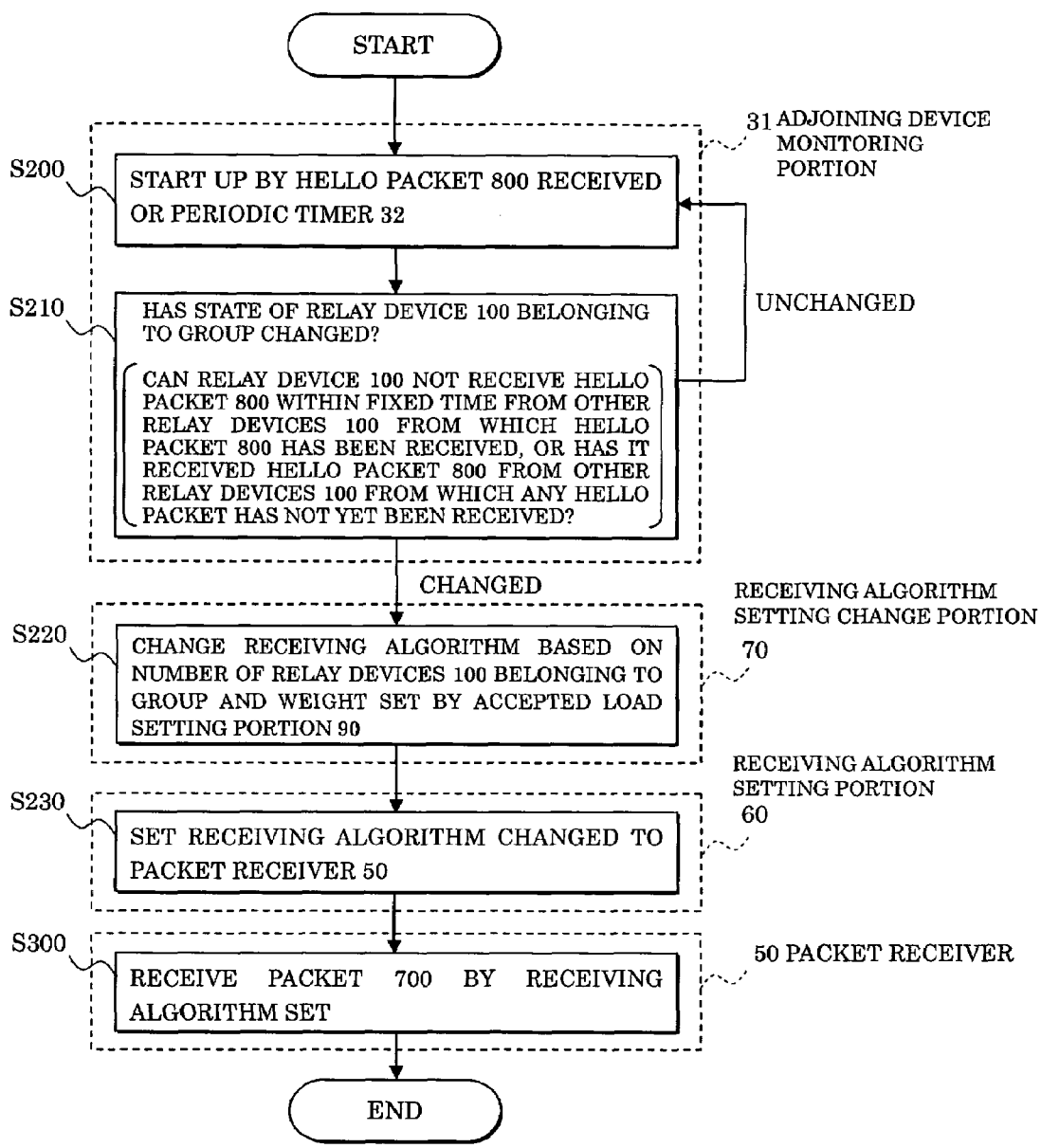
FIG. 7 is a flow chart showing an operation example of a receiving algorithm setting in a relay device according to the present invention.

FIG. 7 shows a procedure example of the receiving algorithm setting operation set in the packet receiver 50. This operation procedure will now be described.

Step S200: The adjoining device monitoring portion 31 is started up either by the hello packet 800 received or by the timer 32 at regular time intervals.

Step S210: The adjoining device monitoring portion 31 determines whether or not the state of the relay devices 100 belonging to the group has changed referring to the group table 40. Namely, the adjoining device monitoring portion 31 determines whether the relay device 100 has not received the hello packet 800 within a fixed time from the other relay devices 100 from which the hello packet 800 has been received periodically, or it has received the hello packet 800 from the other relay devices 100 from which any hello packet has not yet been received.

The adjoining device monitoring portion 31 returns to step S200 when the state has not changed, and notifies the fact that the state has changed, to the receiving algorithm setting change portion 70.

Step S220: The change portion 70 changes the receiving algorithm based on the number of relay devices 100 belonging to the group and the weight set in the group table 40 or the weight newly set by the accepted load setting portion 90. This receiving algorithm will be described later.

Step S230: The receiving algorithm setting portion 60 sets the changed receiving algorithm in the packet receiver 50.

Step S240: The packet receiver 50 receives a packet 700 based on the receiving algorithm set.

Figure 8:
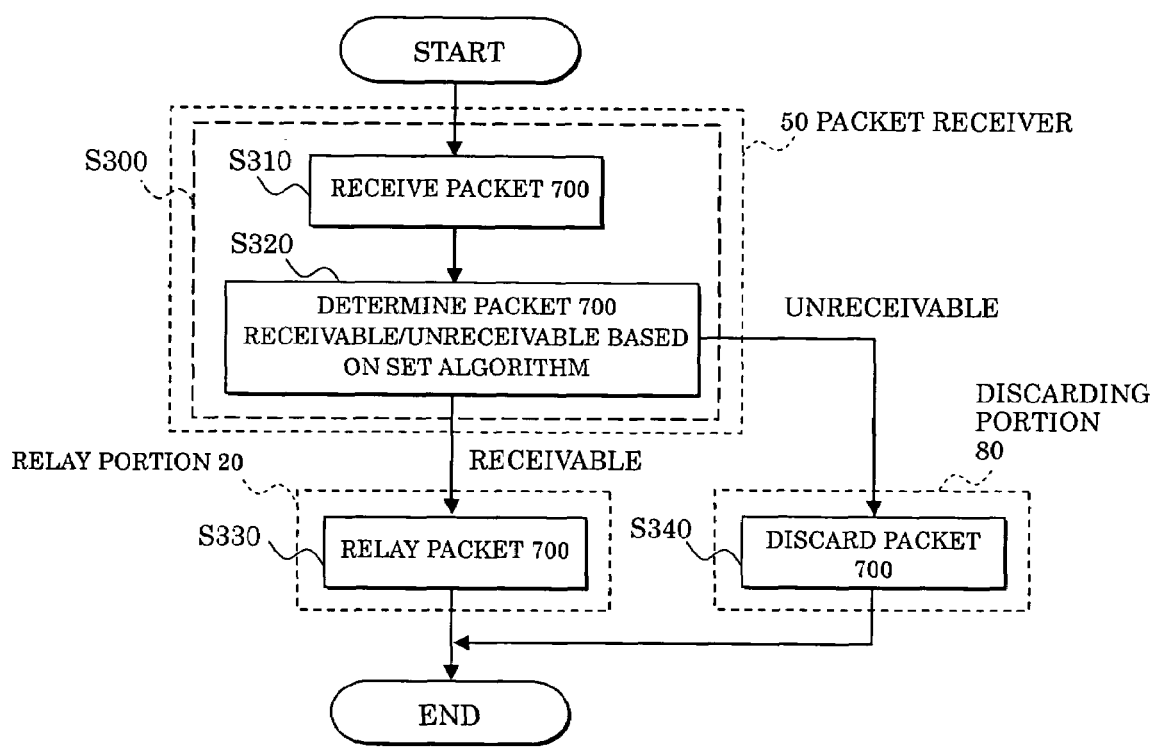
FIG. 8 is a sequence diagram showing an operation example of a packet reception and relay in a network composed of relay devices according to the present invention.

FIG. 8 shows an operation procedure of the packet reception and relay. This operation procedure will now be described.

Step S310: The packet receiver 50 receives the packet 700 from the transmission line 300 (see FIG. 3).

Step S320: The packet receiver 50 determines whether or not to receive the packet based on the set algorithm. When it can be received, the packet receiver 50 transmits the packet 700 to the relay portion 20, and when it can not be received, the packet receiver 50 transmits the packet 700 to the discarding portion 80.

Step S330: The relay portion 20 relays the packet 700 to be transmitted to a transmission line 300_m+1 (see FIG. 3).

Step S340: The discarding portion 80 discards the packet 700.

Figure 9:
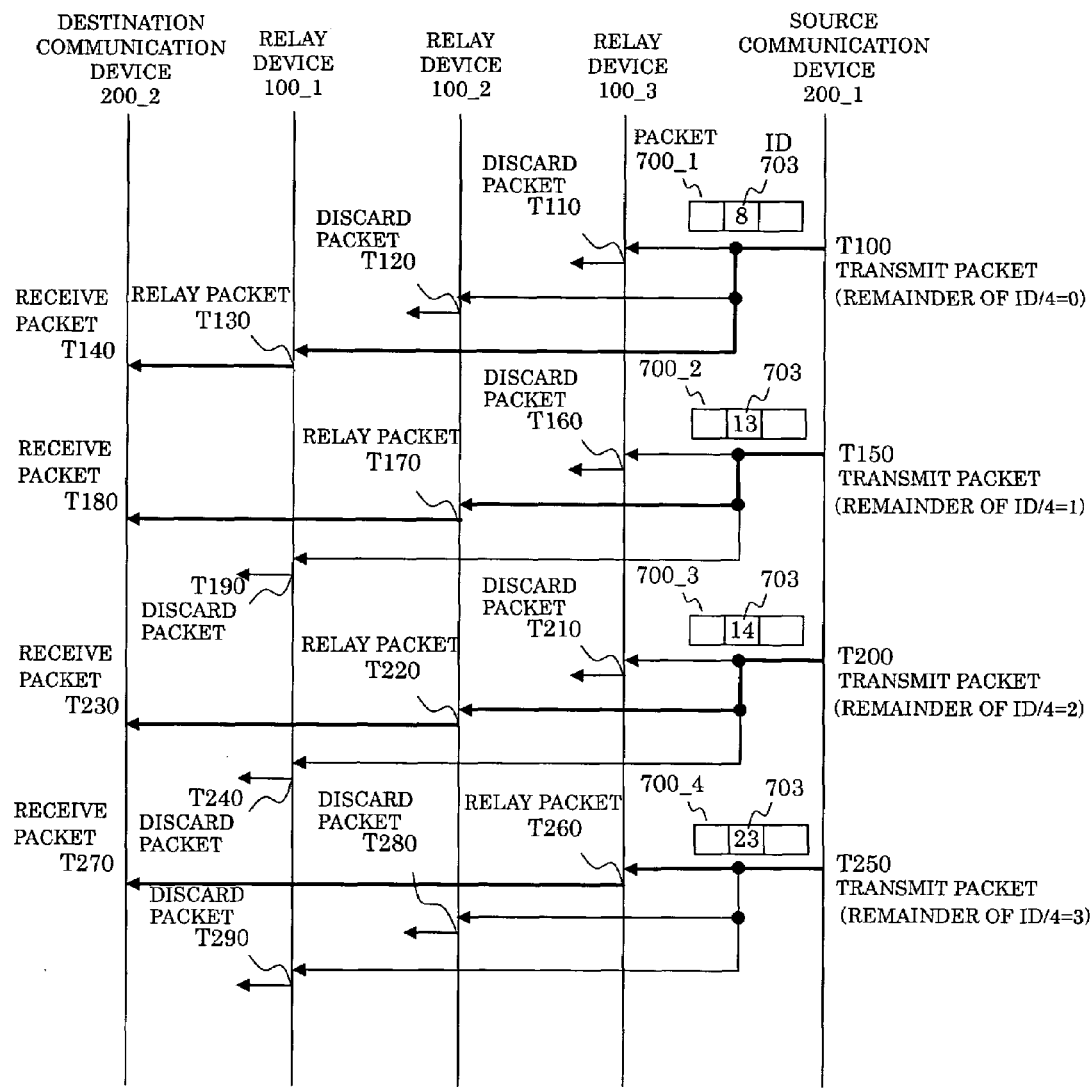
FIG. 9 is a diagram showing an operation procedure example of a packet relay in a relay device according to the present invention.

FIG. 9 shows a procedure example of a relay operation of the relay devices 100_1-100_3 when the communication device 200_1 transmits packets addressed to the communication device 200_2 in the network shown in FIG. 4. This procedure example is determined by the receiving algorithm set in the packet receiver 50 shown in FIG. 7.

Namely, at least one of the load balancing system and the redundancy system can be determined by the receiving algorithm set.

The algorithm set in the relay devices 100_1-100_3 shown in FIG. 9 is one for load balancing and providing the redundancy based on the ID of the packet. This procedure will now be described.

Figure 10:
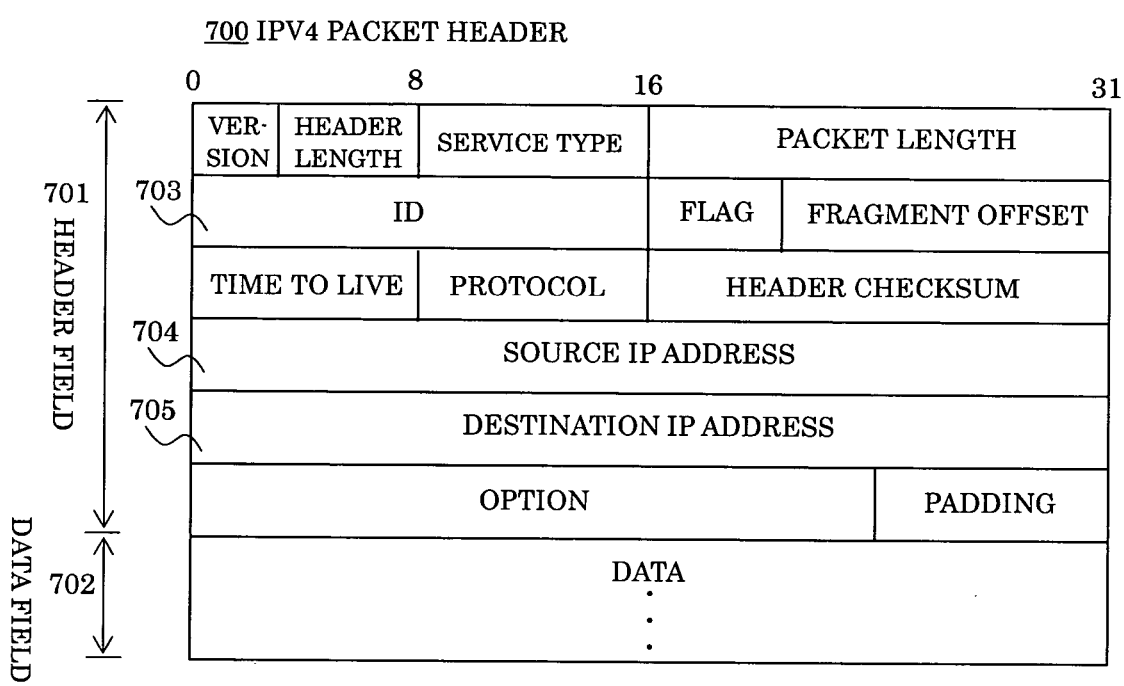
FIG. 10 is a format of a general IPv4 packet.
Figure 11:
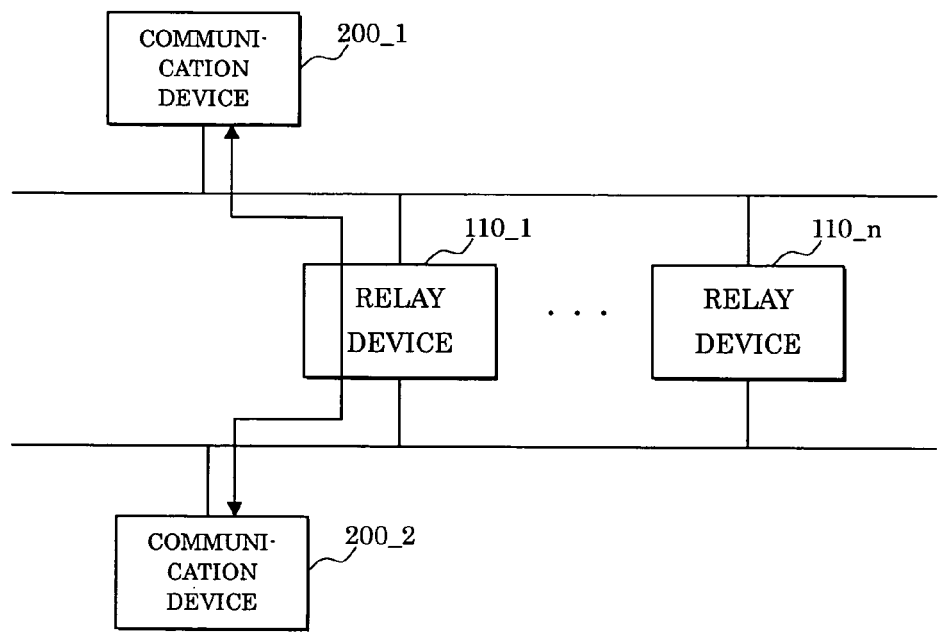
FIG. 11 is a block diagram showing an operation example (1) of a packet relay by a prior art relay device.
Figure 12:
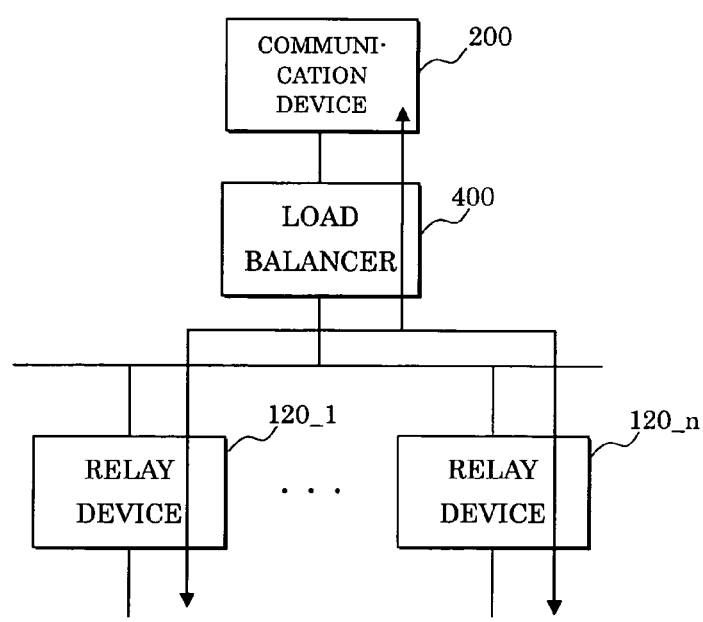
FIG. 12 is a block diagram showing an operation example (2) of a packet relay by a prior art relay device.

FIG. 10 shows a format of an IPv4 packet 700. This packet 700 is composed of a header field 701 and a data field 702. The header field 701 includes an ID 703, a source IP address 704, and a destination IP address 705 which are data identifying information required when the data divided into the packet 700 are restored.

The relay devices 100_1-100_3 relay a packet selected based on the group table 40 shown in FIG. 5.

The packet receiver 50 in each relay device 100 sorts entries in the group table 40 according to the preference based on the algorithm set. In the group table 40 of FIG. 5, the entries are sorted according to the preference order (10, 20, 30) incidentally, and their weights are W(1)=1, W(2)=2, W(3)=1 from the highest preference.

The packet receiver 50 obtains the total weight AW=1+2+1=4 within the group.

The packet receiver 50 of the relay device 100_1 receives one kind of packet for which the following equation (1) is held assuming that the weight of its own device W(1)=1 and the ID of the IPv4 packet=ID.

$$1 = (\text{remainder of } ID/AW) + 1 \qquad \text{Eq.}(1)$$

Namely, the packet of (remainder of ID/AW)="0" is received.

The packet receiver 50 of the relay device 100_2 receives two kinds of packets for which the following equations (2) and (3) are held, since the weight of its own device W(2)=2.

$$W(1) + 1 = (\text{remainder of } ID/AW) + 1 \qquad \text{Eq.}(2)$$

$$W(1) + 2 = (\text{remainder of } ID/AW) + 1 \qquad \text{Eq.}(3)$$

Namely, the packets of (remainder of ID/AW)="1" and "2" are received. Namely, when the ID's are set to all of the packets with the same probability, W(2)/AW=1/2 packets of all the packets are received.

The packet receiver 50 of the relay device 100_3 receives one kind of packet for which the following equation (4) is held, since the weight of its own device W(3)=1.

$$W(1) + W(2) + 1 = (\text{remainder of } ID/AW) + 1 \qquad \text{Eq.}(4)$$

Namely, the packet of (remainder of ID/AW)="3" is received.

Thus, the algorithm for relaying only the packet of the remainder of "packet's ID"/"4"="0" and for discarding the other packets is set in the packet receiver 50 of the relay device 100_1. Similarly, the algorithm for relaying only the packet of the remainder of "packet's ID:/"4"="1" or "2" and for discarding the other packets is set in the packet receiver 50 of the relay device 100_2, and the algorithm for relaying only the packet of the remainder of "packet's ID"/"4"="3" and for discarding the other packets is set in the packet receiver 50 of the relay device 100_3.

Step T100: The source communication device 200_1 transmits a packet 700_1 of the ID="8 (remainder=0)".

Steps T110 and T120: The relay devices 100_3 and 100_2 discard the packet 700_1.

Steps T130 and T140: The relay device 100_1 relays the packet 700_1, and the destination communication device 200_2 receives the packet 700_1.

Step T150: The source communication device 200_1 transmits a packet 700_2 of the ID="13 (remainder=1)".

Steps T160 and T190: The relay devices 100_3 and 100_1 discard the packet 700_2.

Steps T170 and T180: The relay device 100_2 relays the packet 700_2, and the destination communication device 200_2 receives the packet 700_2.

Step T200: The source communication device 200_1 transmits the packet 700_3 of the ID="14 (remainder=2)".

Steps T210, T240, T220, and T230: In the same way as steps T160, T190, T170, and T180, the destination communication device 200_2 receives the packet 700_3.

Step T250: The source communication device 200_1 transmits a packet 700_4 of the ID="23 (remainder=3)".

Steps T280 and T290: The relay devices 100_2 and 100_1 discard the packet 700_4.

Steps T260 and T270: The relay device 100_3 relays the packet 700_4, and the destination communication device 200_2 receives the packet 700_4.

Thus, the relay devices 100_1-100_3 respectively receive ¼, ½, and ¼ packets of all the packets corresponding to the weights (1, 2, 1) by the load balancing. Namely, the packets 700_1-700_4 are load balanced within the relay devices 100_1-100_3 to be transmitted.

It is to be noted that while the source of the packets is the communication device 200_1 and the destination is the same communication device 200_2 in FIG. 9, another communication device 200 can be set as the destination.

Also, if an algorithm is set in the packet receiver 50 of each relay device 100 so that the packet 700 is transmitted at a permissible transmission capacity with some margin in comparison with a transmittable capacity of the relay device, when e.g. the relay device 100_3 becomes unavailable due to the occurrence of a fault, the packet 700_4 can be detoured to the relay devices 100_1 and 100_2 by changing the receiving algorithm of the other relay devices 100_1 and 100_2. Namely, the redundancy can be provided.

The operation when e.g. the relay device 100_2 becomes a disabling state of relaying packets, namely, when the relay devices belonging to the group="1" are relay devices 100_1 and 100_3 will now be described. In this case, the total weight within the group AW=1+1=2.

The packet receiver 50 of the relay device 100_1 relays only the packet of the remainder of ID/2="0", and discards the other packets.

The packet receiver 50 of the relay device 100_3 relays only the packet of the remainder of the ID/2="1", and discards the other packets.

Namely, the relay devices 100_1 and 100_3 respectively relay the half of all the packets by load balancing as redundant devices of the relay device 100_2.

As described above, a relay device according to the present invention is arranged such that a monitoring portion monitors states of other relay devices belonging to the same group, and a load balancing receiver load balances receiving packets with the other relay devices or provides redundancy based on the states of the other relay devices. Therefore, it becomes possible to realize load balancing, redundancy, or both of load balancing and redundancy by a plurality of relay devices in the communication between communication devices.

Also, since whether or not to relay packets is determined based on a group table preset, the packets can be easily selected.

Furthermore, compared with the prior art method, the present invention provides higher redundancy, improves performance and reliability, and is more practical.

I claim:

1. A relay device among a plurality of relay devices belonging to a single group or divided into two or more groups comprising:
   a periodic transmitter periodically transmitting a control packet including a device identifier of the device itself, a weight indicating a degree of communication load to be accepted, and a preference indicating an order within a same group;
   a device monitoring portion receiving a control packet including a device identifier, a weight indicating a degree of communication load to be accepted, and a preference indicating an order within a same group of another device, and registering the device identifier, the weight, and the preference received, in a group table in a mutually associated manner;
   a relaying identifier setting portion determining at a predetermined timing a packet identifier to be relayed based on the preference registered by the device monitoring portion in the group table as well as the preference of the device of its own, and the weight registered in the group table as well as the weight of the device itself; and
   a relaying control portion relaying a packet of the packet identifier determined by the relaying identifier setting portion and discarding a packet other than the packet identifier.

2. The relay device of claim 1, wherein the relaying identifier setting portion determines a preference order by sorting the preference registered in the group table and the preference of the device itself, and determines a packet identifier to be relayed so that the remainder obtained by dividing the preference order with a total of the weight registered in the group table and the weight of the device itself ranges from a sum of a total of the weights of the devices having the preferences, registered in the group table, higher than the preference of the device itself plus 1 to a sum of a total of the weights of the devices having the preferences higher than the preference of the device itself plus the weight of the device itself.

3. The relay device of claim 1, wherein the predetermined timing comprises a timing when the control packet is received by the device monitoring portion, or a timing provided at a fixed period based on a timer.

* * * * *